United States Patent [19]
Kasanuki et al.

[11] Patent Number: 5,481,527
[45] Date of Patent: Jan. 2, 1996

[54] INFORMATION PROCESSING APPARATUS WITH FERROELECTRIC REWRITABLE RECORDING MEDIUM

[75] Inventors: Yuji Kasanuki, Isehara; Haruki Kawada, Yokohama; Yoshihiro Yanagisawa, Isehara, all of Japan

[73] Assignee: Canon Kabushiki Kaisha, Tokyo, Japan

[21] Appl. No.: 29,057

[22] Filed: Mar. 10, 1993

[30] Foreign Application Priority Data

Mar. 31, 1992 [JP] Japan ..................... 4-103797

[51] Int. Cl.⁶ .................. G11B 9/00; G11C 11/22
[52] U.S. Cl. ............... 369/126; 369/13; 365/117; 365/145; 250/306
[58] Field of Search ............... 369/13, 126, 100; 365/117, 145, 176; 250/306

[56] References Cited

U.S. PATENT DOCUMENTS

| | | | |
|---|---|---|---|
| 4,139,908 | 2/1979 | Brody | 369/13 |
| 4,907,195 | 3/1990 | Kazan et al. | 365/118 |
| 5,146,299 | 9/1992 | Lampe et al. | 365/145 |
| 5,171,992 | 12/1992 | Clabes et al. | 250/306 |
| 5,260,567 | 11/1993 | Kuroda et al. | 250/306 |
| 5,260,824 | 11/1993 | Okada et al. | 250/306 |
| 5,260,926 | 11/1993 | Kuroda et al. | 369/126 |
| 5,262,981 | 11/1993 | Rabe et al. | 369/126 |
| 5,276,672 | 1/1994 | Miyazaki et al. | 369/126 |
| 5,278,704 | 1/1994 | Matsuda et al. | 369/126 |

FOREIGN PATENT DOCUMENTS

| | | |
|---|---|---|
| 0272935 | 6/1988 | European Pat. Off. |
| 0275881 | 8/1988 | European Pat. Off. |
| 61-80536 | 4/1986 | Japan |
| 63-161553 | 7/1988 | Japan |
| 63-161552 | 7/1988 | Japan |
| 63-193349 | 8/1988 | Japan |
| 1134753 | 5/1989 | Japan |

OTHER PUBLICATIONS

Petersen, Silicon as a Mechanical Material, Proceedings of the IEEE, vol. 70, No. 5, May 1982, pp. 420–457.

"Surface Studies by Scanning Tunneling Microscopy", by G. Binning et al.; IBM Zurich Research Lab., Switzerland; Physical Review Letter; Jul. 5, 1982 pp. 57–611.

Primary Examiner—Georgia Y. Epps
Assistant Examiner—Kim-Kwok Chu
Attorney, Agent, or Firm—Fitzpatrick, Cella, Harper & Scinto

[57] ABSTRACT

In an information processing apparatus which records and reproduces information by rotating a cylindrical recording medium on the basis of the principles of a scanning type tunnel microscope, the speed of the probe relative to that of the recording medium becomes fixed, and resonance and a decrease in an S/N ratio of reproduced signals during high-speed scanning can be prevented. Thus, information processing at a large capacity and high-speed response with a high degree of accuracy is made possible. An information processing system that records and reproduces information on the basis of the principles of a scanning type tunneling or an atomic force microscope employs a ferroelectric layer in the recording medium to simplify and improve reproduction. The recording medium may include a rotating cylindrical medium wherein the speed of the probe is fixed relative to that of the cylindrical medium to prevent resonance and to decrease the signal-to-noise ratio of reproduced signals during high speed scanning. Large capacity, accurate and high speed information processing is thereby obtained.

13 Claims, 16 Drawing Sheets

PROBE-SCANNED TRACE

RECODING MEDIUM SURFACE

INFORMATION PROCESSING APPARATUS WITH FERROELECTRIC REWRITABLE RECORDING MEDIUM

BACKGROUND OF THE INVENTION

1. Field of the Invention

The present invention relates to a novel information processing apparatus capable of writing, reading or erasing information by utilizing the technology of scanning type tunneling microscopes, scanning type atomic force microscopes, scanning type magnetic-force microscopes or the like, and to an information processing method employing the same.

2. Description Of the Related Art

In recent years, applications of memory elements have been of particular importance to the electronics industry relating to computers, devices related to them, video disks, digital audio disks or the like. Memory elements are being developed one after another. Examples of performance required of memory elements are generally as follows:

(1) High density and large recording capacity (2) High response speed in recording and reproduction (3) Low error rate (4) Small amount of power consumption (5) High productivity, and low cost.

In the past, semiconductor memories and magnetic memories in which magnetic bodies or semiconductors are used as materials are in the mainstream. However, with the recent advancements in laser technology, inexpensive, high-density recording media formed from optical memories using organic thin films, such as organic coloring matter or photopolymer, have appeared.

In the meantime, since a scanning type tunneling microscope (hereinafter abbreviated as STM) capable of directly observing the electronic structure of atoms on a surface of a conductor recently has been developed [G. Binning et al. Phys. Rev. Lett, 49, 57(1982)], it has become possible to measure a real space image with a high degree of resolution whether it is a single crystal or amorphous. Moreover, the STM has an advantage in that a specimen can be observed with low power without being damaged by electric current. In addition, since the STM can operate in air and can be used for various materials, a wide range of applications are expected.

Such STMs use the fact that when a voltage is applied between a metallic probe (probe electrode) and an electro-conductive matter placed at a distance of approximately 1 nm, tunnel current flows. This current is very sensitive to changes in the distance between the probe and the electro-conductive matter. Various information on real space electron clouds can also be read by scanning a probe in such a way that the tunnel current is maintained constant. At this time, resolution in an in-plane direction is approximately 0.1 nm.

Therefore, the application of the principle of an STM makes high-density recording and reproduction possible on an atomic order (sub-nanometer). In a recording and reproducing apparatus disclosed in, for example, Japanese Patent Laid-Open No. 61-80536, after atomic particles adsorbed on a surface of a medium are removed by an electron beam or the like, writing is performed and data is reproduced by a STM.

A method in which recording and reproduction are performed by the STM by using a material having a memory effect (electric memory effect) for voltage/current switching characteristics as a recording layer has been disclosed, an example of said material being a thin-film layer of $\pi$ electron type organic compounds, chalcogen compounds [Japanese Patent Laid-Open Nos. 63-161552 and 63-161553]. According to this method, if the bit size of recording is set at 10 nm, large-capacity recording and reproduction of as much as $10^{12}$ bits/cm$^2$ is possible. A method of recording and reproduction employing the principles of an STM by using an electrically polarizable layer, for example, a thin-film layer of a ferroelectric substance, such as polyvinylidene fluoride, is disclosed in Japanese Patent Laid-Open No. 63-193349. According to this method, recording density of $10^{10}$ bits/cm$^2$ can be achieved.

In the meantime, an atomic force microscope (hereinafter abbreviated as AFM) using STM technique has been developed [G. Binning et al., Phys. Rev. Lett, 56, 930(1986)], and information on irregularities on a surface can be obtained with AFMs in the same manner as with STMs. As AFMs are capable of measuring insulating specimens on an atomic order, advancements in such a microscope in the future are expected.

AFMs are constructed so as to support a probe by an elastic member and convert a displacement by the spring force of the elastic member. In an example of this construction, a probe is provided in the center of a beam supported at both ends or in the free end of a cantilever beam. Use of foils formed from Au, Ni, SUS, BeCuP, or the like is preferable for the materials of the beam. To prepare a very small beam used widely in micromechanics, preferable examples are SiO$_2$ thin films and SiN thin films.

Examples of methods of detecting a displacement are a laser interference method (heterodyne detection), an electrostatic capacitance change detection method, and a method using an STM. Since an interatomic force is extremely small, a probe and an elastic support must be soft, but at the same time strong enough to withstand vibrations from outside.

An information processing apparatus using the AFM technique consisting of a scanning type capacitance microscope and a recording medium having silicon oxide and silicon nitride stacked on silicon (nitride-oxide-silicon, hereinafter abbreviated as NOS) has recently been developed [R. C. Barret et al. J.Appl.Phys., 70, 2725 (1991)]. The structure of NOS is shown in FIG. 11. NOS has the same layer construction as that of a memory used in EEPROMs whose upper electrode layer is removed. NOS is formed in such a way that an oxide film 112 for a tunnel barrier and a silicon nitride film 113 for trapping electrons are formed on a doped Si substrate 111. The SiO$_2$ oxide film 112 has a thickness of approximately 10 to 50 Å, and the SiN film 113 has a thickness of approximately 500 Å. FIG. 12 illustrates the construction of an information processing apparatus using an NOS recording medium. A probe electrode 1 is provided at an extreme point of the free end of a cantilever beam 2 which is an elastic supporting member.

The cantilever beam 2 is produced by using silicon crystal anisotropic etching technology and is formed from an SiO$_2$ film. Such a production method is well known as a technique used in micromechanics [X. E. Petersen, Proc. IEEE 70, 420 (1982)].

A metallic film is vapor deposited in the form of wiring on the cantilever beam 2. The probe electrode 1 is connected to a capacitance sensor 122, a power supply or the like. A DC bias, a modulation signal, and a pulse voltage are applied to the recording medium and the probe electrode 1 during recording and reproduction.

Next, an explanation will be given of recording and reproduction performed by this information processing apparatus. To perform recording, an application of a pulse voltage greater than a threshold voltage causes electric charge from the silicon substrate 111 to tunnel through the $SiO_2$ film 112 and to be trapped in an SiN film 113. As a result, information is recorded. To perform reproducing, an appropriate bias is applied to the recording medium and the probe electrode 1, a modulation signal is carried thereon, and capacitance changes during the scanning of the probe electrode 1 are detected. Since the capacitance between the probe electrode 1 and the recording medium changes depending upon whether a charge is trapped in the SiN film 113, information can be read out. To perform erasing, it is only necessary to apply a pulse voltage of the polarity opposite to that during recording.

Since the information processing apparatus performs recording and reproduction by a method employing an AFM having a resolution on an atomic and molecular scale, recording bits can be made much smaller, and it is thus easy to increase the capacity thereof. A major feature thereof is that a rewritable non-volatile memory is used.

FIG. 13 illustrates the construction of an information processing apparatus in which an STM is used.

Referring to FIG. 13, reference numeral 131 denotes a recording medium; reference numeral 132 denotes a substrate; reference numeral 133 denotes a substrate electrode; and reference numeral 134 denotes a recording layer. Reference numeral 1 denotes a probe electrode; reference numeral 135 denotes an XY stage; reference numeral 136 denotes a member for supporting the probe electrode; reference numeral 137 denotes a Z-axis linear actuator for driving the probe electrode in a Z direction; and reference numerals 138 and 139 denote linear actuators for driving the probe electrode along the X axis and along the Y axis, respectively.

Reference numeral 140 denotes an amplifier for detecting a tunnel current flowing from the probe electrode 1 through the recording layer 134 to the substrate electrode 133; reference numeral 141 denotes a compressor for converting a change in tunnel current into a value proportional to the distance between the probe electrode 1 and the recording layer 134; reference numeral 142 denotes a low-pass filter for extracting components of irregularities on a surface of the recording layer 134; reference numeral 143 denotes an error amplifier for detecting a discrepancy between a reference voltage $V_{REF}$ and an output from the low-pass filter 142; reference numeral 144 denotes a driver for driving the Z-axis linear actuator 137; reference numeral 145 denotes a driving circuit for controlling the positioning of an XY stage; and reference numeral 146 denotes a high-pass filter for separating data components.

Reference numeral 7 denotes a circuit for applying a pulse voltage for performing recording, reproduction and erasure between the probe electrode 1 and the electrode 133. When a pulse voltage is applied, a probe current sharply changes. Therefore, the driver 144 turns on a HOLD circuit (not shown) so that an output voltage becomes constant during the time that the pulse voltage is applied.

Another example of the information processing apparatus in which a STM is used is shown in FIG. 14 (Japanese Patent Laid-Open No. 1-134753).

This information processing apparatus has the following advantages as compared to the above-described information processing apparatus. First of all, high-speed scanning is possible. In a case where a two-dimensional scanning in X and Y directions is performed by a probe, if a scanning frequency is increased, high-order frequency components occurring at reciprocating scanning turns cause a scanning mechanism to resonate. However, when a recording medium 152 is located on a disk 151 as shown in FIG. 14, scanning is performed only radially, thereby substantially suppressing resonance and making high-speed scanning possible.

Secondly, the scanning mechanism is simple. Since the recording medium 152 rotates a constant number of rotations, if the probe can be controlled to move only radially, it can scan the entire recording surface. As compared to the two-dimensional scanning in X and Y directions, the scanning mechanism can be made more compact.

Next, the construction of an information processing apparatus in which both the AFM and STM techniques are used is shown in FIG. 15. This apparatus is designed to control the distance between a probe and a recording medium by a spring force of an elastic member supporting the probe by applying an AFM, as compared with the STM which controls the distance between the probe and the recording medium to be constant by using a tunnel current. The apparatus of FIG. 15 has an advantage in that a control system using a feedback circuit need not be provided for controlling the distance between the probe and the recording medium.

However, the prior art described above has problems as described below.

A first problem of the information processing apparatus using a NOS recording medium shown in FIG. 12 is that a threshold value during writing depends greatly upon the thickness of the $SiO_2$ oxide film 112 for the tunnel barrier of a recording medium. Since the $SiO_2$ oxide film 112 is extremely thin, it is difficult to precisely control the thickness of the film. For this reason, recording characteristics differ from recording medium to recording medium. A second problem of the information processing apparatus is that non-volatility deteriorates as the number of times writing is performed increases. Although non-volatility of this memory is retained by the $SiO_2$ oxide film 112, the deterioration occurs if writing is performed many times since a trapped charge leaks because the $SiO_2$ oxide film 112 is damaged. A third problem of the information processing apparatus is that since capacitance changes are used to reproduce information, the capacitance sensor 122 must be mounted on a probe electrode and a lock-in amplifier 121 must be connected thereto, thus enlarging the apparatus and making it complex.

In an information processing apparatus using a recording medium based on the principles of an STM and formed from a ferroelectric substance, information is written by applying an electric field based on the principles of an STM. Reading of information is performed by a complicated method in which a recording layer is heated by laser beam irradiation or high-frequency heating, the recording medium is activated pyroelectrically, and signals which occur are detected by an ultra-high resolution electrometer probe in a standard electrometer. It cannot be said that this is a simple method.

The information processing apparatus shown in FIG. 13 has a problem in that when a probe or a recording medium is scanned two-dimensionally in X and Y directions, resonance is likely to occur in the scanning mechanism if the scanning frequency increases.

The information processing apparatus shown in FIG. 14 has a problem described below. FIG. 16 illustrates the signal intensity spectrum of signals with respect to frequency during reproduction. Signals of frequency components lower than $f_0$ are caused by gentle irregularities of a recording medium due to warping, strain or the like of the disk 151.

Signals with $f_1$ as the center are caused by irregularities on a surface of the recording medium. $f_2$ indicates carrier wave components of recording data, and reference numeral 171 denotes a data signal band. $f_2$ indicates a signal band which occurs due to the atomic and molecule array of the recording medium, and $f_T$ indicates a tracking signal.

The curved dashed line in this figure indicates a signal intensity spectrum when the probe is positioned at a given radius. The speed of the probe relative to that of the recording medium depends upon the position of the probe; the larger the radius, the higher the peripheral velocity of the probe becomes. Therefore, even if carrier waves or the tracking signal do not change, the components corresponding to the irregularities of the recording medium shift to a low or high frequency side in accordance with the position of the probe. As a result, the signal intensity spectrum of the signals reproduced from recorded information indicate a broad characteristic as a whole as indicated by the solid line. This makes it difficult to separate the tracking signal and the reproduced data signal, causing a decrease in the S/N ratio of the signals.

The information processing apparatus using AFM/STM shown in FIG. 15 has the same problem as that of the above-described apparatus in that the intensity spectrum of the signals expands broadly. FIG. 17 schematically illustrates a surface of the recording medium and a trace of a probe which scans the surface; FIG. 17(a) illustrates a case when the scanning speed is low, and FIG. 17(b) illustrates a case when the scanning speed is high. As can be seen in FIG. 17, the trackability of the probe onto the recording medium surface is affected greatly by the scanning speed. That is, the probe's signal intensity spectrum is broadly expanded as in the above-described example, causing a decrease in the S/N ratio of the signals.

SUMMARY OF THE INVENTION

Accordingly, it is an object of the present invention to provide a novel information processing apparatus having a high S/N ratio of reproduced signals and capable of high-speed processing of information.

It is another object of the present invention to provide an information processing apparatus and information processing method capable of high-density recording and high-speed processing by using a highly durable and reliable recording medium.

According to one aspect of the present invention which achieves the above-described objects, an information processing apparatus records and reproduces information by detecting a force acting between a probe and a surface of a recording medium. The information processing apparatus includes a unit for applying a voltage between the probe and an electrode of the recording medium, and a displacement detector that detects a force acting between the probe and the recording medium, the recording medium having a ferroelectric substance layer provided on an electrode of the recording medium.

According to another aspect of the present invention which achieves the above-described objects, an information processing method includes reproducing information by bringing a probe closer to a recording medium having a ferroelectric substance layer provided on an electrode of the recording medium in which information is recorded in the form of changes of spontaneous polarization, and detecting a change in a force acting between the probe and the recording medium.

According to yet another aspect of the present invention which achieves the above-described objects, an information recording apparatus records and reproduces information by detecting electric current flowing between a probe and a surface involved in information processing or by detecting a force acting between a probe and a surface involved in information processing. The surface related to information processing is present on the circumferential surface of a cylindrical base and the information recording apparatus includes a driving unit that rotates the cylindrical base.

The above and further objects and novel features of the invention will more fully appear from the following detailed description when the same is read in connection with the accompanying drawings. It is to be expressly understood, however, that the description and drawings are for the purpose of illustration only and are not intended as a definition of the limits of the invention.

DETAILED DESCRIPTION OF THE PREFERRED EMBODIMENTS

According to a first embodiment of the present invention, problems, such as unstable recording characteristics of a NOS recording medium caused by a tunnel barrier layer, or deterioration of non-volatility of the NOS recording medium, do not occur when a ferroelectric substance is used in the recording layer which forms the recording medium. Also, recorded information is reproduced by position detecting the polarity of spontaneous polarization of the ferroelectric substance by detecting a force between a probe electrode and the recording medium in an information processing apparatus using the recording medium. As a result, components such as capacitance sensors or lock-in amplifiers are not needed and there is no need to selectively heat a recording layer and to read signals which occur as a result of pyroelectrically activating the recording medium with an electrometer. Thus, the apparatus can be simplified and miniaturized.

Figure 1:
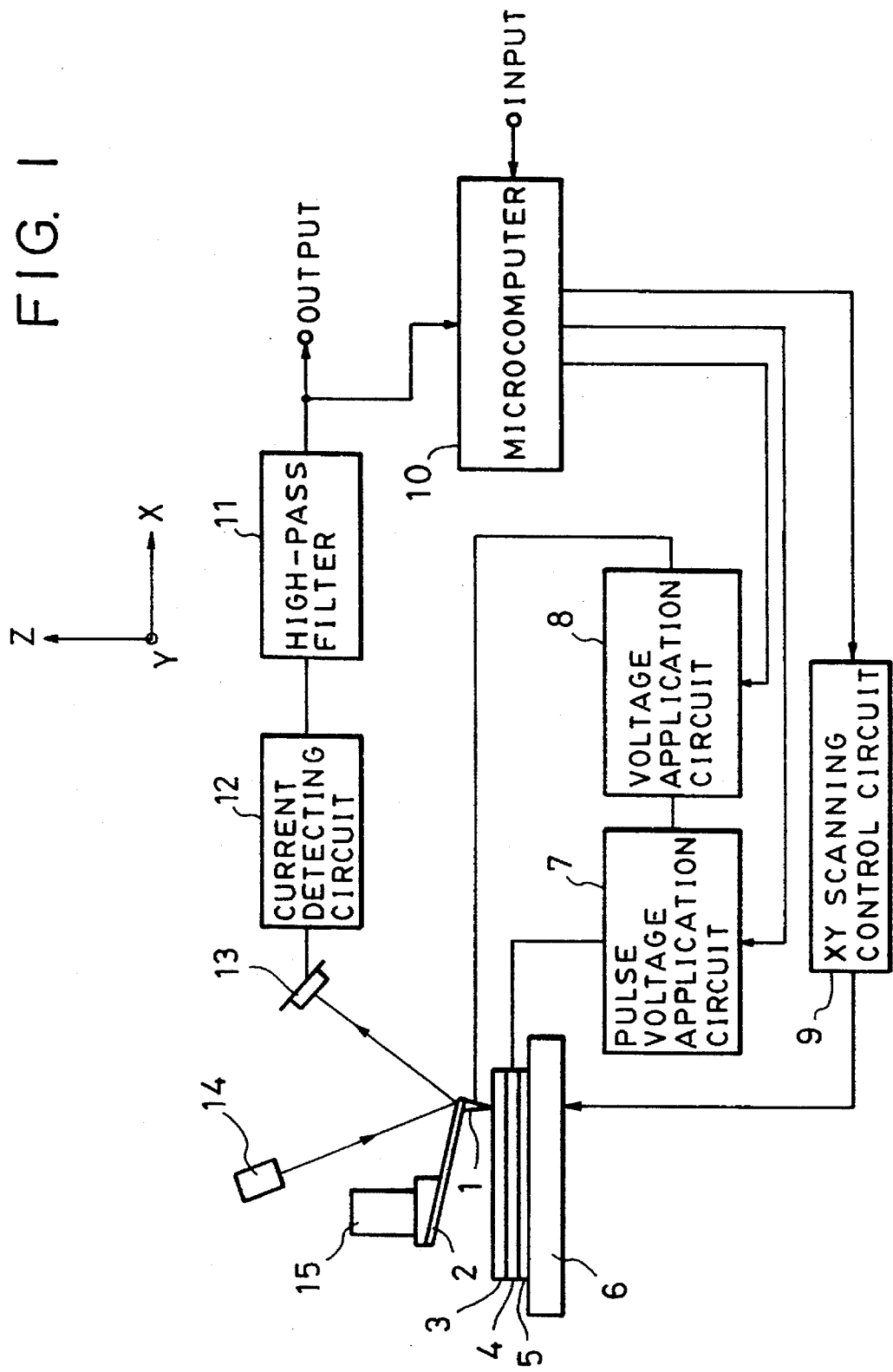
FIG. 1 illustrates the construction of an information processing apparatus of the present invention.

FIG. 1 illustrates the construction of an information processing apparatus according to the first embodiment of the present invention.

A recording medium used in the present invention is formed by a lower electrode layer 4 and an upper ferroelectric layer 3. The lower electrode layer 4 may be formed not only from a metal, such as Au or Pt, but also from a semiconductor composed of Si or the like. It is desirable that the surface of the electrode be not warped or strained.

Materials having ferroelectric properties may be used for the upper ferroelectric layer 3. Examples thereof include a number of materials, such as $PbTiO_3$, $Bi_4Ti_3O_{12}$, $BaTiO_3$, $LiNbO_3$, $LiTaO_3$, PZT (lead zirconate titanate), PLZT (lead lanthanum zirconate titanate), and ferroelectric high-polymers, such as VDF/TrFE (vinylidene fluoride/ethylene trifluoride) copolymer, PVDF (vinylidene polyfluoride). It is possible to apply these materials to the present invention.

An elastic supporter 2 for supporting the probe electrode 1 is constructed so as to convert forces into displacement by means of a spring force of the elastic supporter 2. In an example of the construction, a probe is provided in the center of a beam supported at both ends or in the free end of a cantilever beam. Use of foils formed from Au, Ni, SUS, BeCuP, or the like is preferable for the materials of the beam. $SiO_2$ thin films and SiN thin films are preferable examples for preparing a very small beam used in micro-mechanics.

Displacement of the elastic supporter 2 is detected by passing signals from a current detection circuit 12 through a high-pass filter 11 with the use of a laser 14 and a photodiode 13. Even though a detection method using an optical lever is shown in FIG. 1 as displacement detection means, a laser interference method (heterodyne detection), an electrostatic capacitance change detection method, or a method using an STM may also be used.

Next, an explanation will be given of a recording and reproduction method which is an information processing method.

A case in which the direction of the spontaneous polarization of a recording medium is perpendicular to the substrate after a polarization operation will now be explained. However, the same applies for other directions.

To perform recording, a pulse voltage is applied between the probe electrode 1 and the lower electrode layer 4 of the recording medium by a pulse voltage application circuit 7. The voltage at this time should be set so that an electric field larger than a resisting electric field of the ferroelectric substance of the recording medium is applied to the recording medium. The direction of the spontaneous polarization of the recording medium is determined in correspondence with the polarity of this pulse voltage. Thus, information can be recorded.

Figure 2:
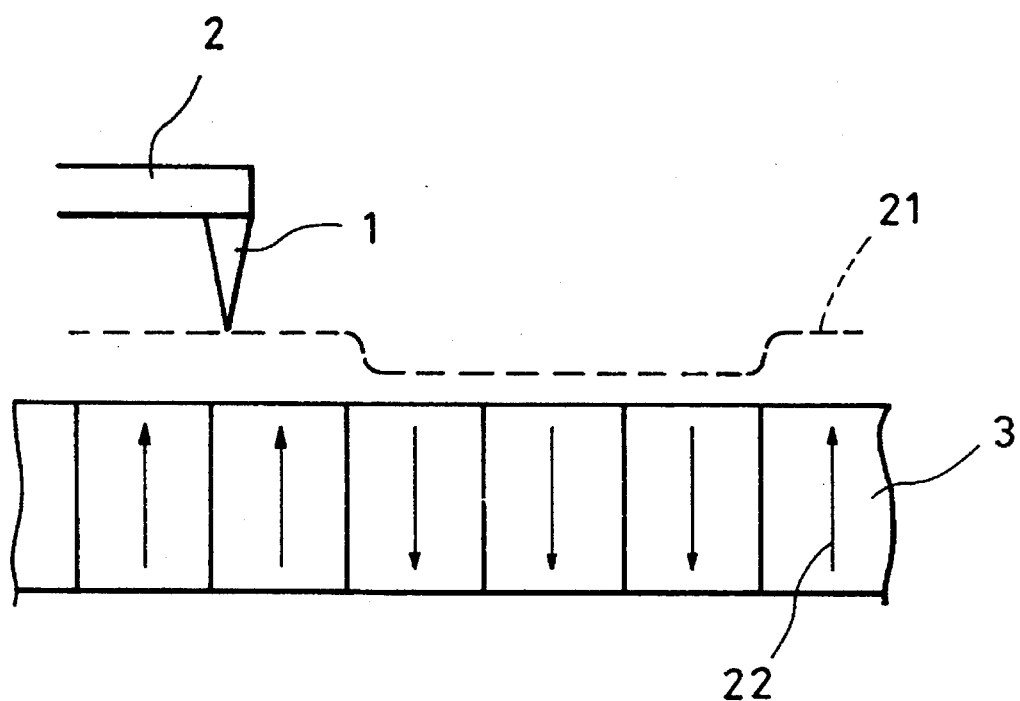
FIG. 2 is a schematic illustration of a trace of a probe electrode during reproduction of recorded information.
Figure 3A:
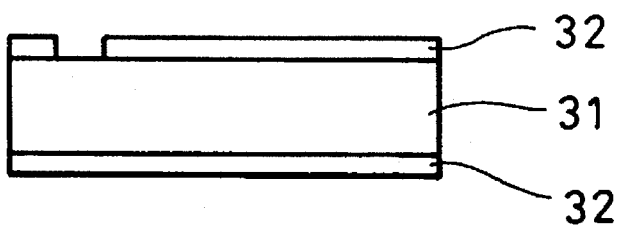
FIGS. 3(a), 3(b), 3(c), 3(d) and 3(e) are flow diagrams illustrating preparation of a cantilever beam, which is an example of an elastic supporting member according to the present invention.
Figure 3B:
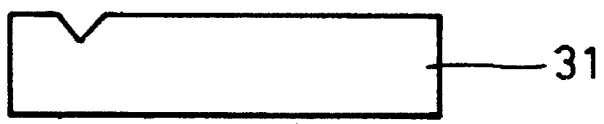
Figure 3C:
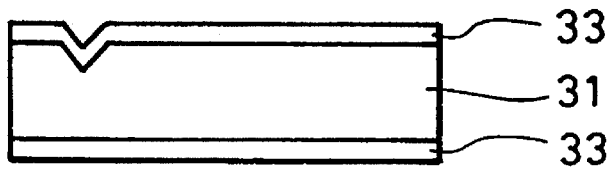
Figure 3D:
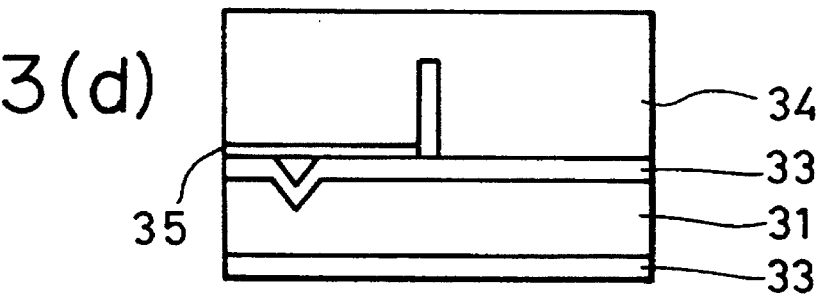
Figure 3E:
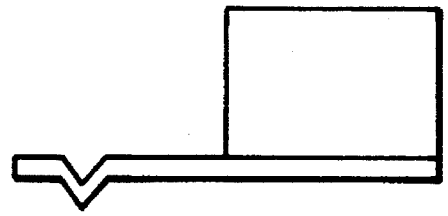

When recorded information is reproduced, an appropriate voltage is applied to the probe electrode 1 and the lower electrode layer 4 of the recording medium, and the probe electrode 1 is scanned by an XY scanning driving mechanism 6. The trace of the probe electrode 1 at this time is schematically shown in FIG. 2. In this figure, reference numeral 21 denotes the trace of the probe electrode 1, and reference numeral 22 denotes the direction of spontaneous polarization. At this time, an electrostatic force resulting from electrical charge on the surface of the recording medium acts on the probe electrode 1. This is detected as a change in the displacement of the elastic supporter 2. Although irregularity components due to warping, strain or the like on the surface of the recording medium are contained in signals as changes in displacement, components due to an electrostatic force can be extracted by passing the signals through the high-pass filter 11.

Next, a second embodiment of the present invention will be explained.

The second embodiment of the present invention concerns an information processing apparatus capable of preventing previously mentioned resonance which occurs during high-speed scanning when a recording medium is two-dimensionally scanned in X and Y directions or when a recording medium is one-dimensionally scanned as in a disk, preventing a decrease in the S/N ratio of reproduced signals, and which makes large capacity, high-speed response and accurate information processing possible.

That is, the second embodiment of the present invention pertains to an information processing apparatus which records information on and reproduces information from a recording medium by using a tunnel current or an interatomic force, the recording medium being formed on the circumferential surface of a cylindrical base, the information processing apparatus comprising driving means for rotating the cylindrical base. The information processing apparatus according to the second embodiment of the present invention will be explained in detail with reference to the embodiments which will be explained later.

Next, another embodiment of the present invention will be explained. As was previously explained, various signals can be obtained by scanning a surface of a recording medium by a probe electrode 1. Components of this signal include irregularity components due to warping or strain on the surface of the recording medium, and components characteristic of the scanning method or the like. To reliably obtain wanted signal components, the S/N ratio of these signals must be increased as much as possible. As a means for this, as a step in the manufacturing of a recording medium, the surface of an electrode layer which forms the recording medium is smoothed by heat treatment. The second embodiment of the present invention provides highly reliable recording mediums capable of reducing damage, such as film peeling-off, which might occur during the heat treatment step.

The present invention pertains to a method of manufacturing recording media for use in an information processing apparatus in which the principles of a scanning type tunnel microscope or an interatomic force microscope are used. The recording medium may be formed of: a lower electrode layer having an electroconductive thin film on a substrate; and an upper recording layer, preferably a monomolecular film of an organic compound or a stacked film in which the monomolecular films are stacked, more preferably, an upper recording layer having a group of organic compounds having a π electron level and a σ electron level within the molecules. The lower electrode layer is heat treated in an inert gas atmosphere or under a reduced pressure, and preferably is heat treated at a temperature lower than the melting point of the electroconductive thin film material after a plurality of holes or grooves are formed in a portion of the electroconductive thin film formed from noble metals, alloys of noble metals or the like, by a focused ion beam method, an ion milling using a resist, or a wet etching method using a resist. In addition, the present invention pertains to an information processing apparatus which records information on and reproduces it from a recording medium manufactured by the above-described recording medium manufacturing method by using a tunnel current or an interatomic force.

Next, the second embodiment of the present invention will be explained with reference to the figures.

FIGS. 5(a)–5(d) are flow diagrams illustrating an example of manufacturing a recording medium. First, a thin film formed from an electroconductive material, which film forms a substrate electrode 52, is formed on a substrate 51 (FIG. 5(a)). Next, a plurality of holes or grooves 53 reaching the substrate are formed (FIG. 5(b)). Next, the substrate is heat treated to smooth the electroconductive thin film, thus forming the substrate electrode 52 (FIG. 5(c)). Then, a recording layer 54 is stacked on the smoothed electroconductive thin film. Thus, a recording medium is obtained (FIG. 5(d)).

Since the substrate 51 in the present invention is used to support the substrate electrode 52, any material having a smooth surface may be used. However, usable substrate materials are limited to some extent depending upon the method of forming the substrate electrode 52.

Highly electroconductive materials are preferable as materials for a substrate electrode. Examples thereof include a great number of materials: metals, such as Au, Pt, Ag, or Pd, or alloys of these metals. It is possible to apply these materials to the present invention. Use of a conventional well-known thin film technique is adequate for a method of forming electrodes using such materials.

Examples of forming holes or grooves in an electroconductive thin film are: etching by direct processing by a focused ion beam method, or etching by indirect processing using a resist. However, any method capable of forming a hole on an electroconductive thin film, which hole reaches a substrate, without affecting the substrate may be used. Any method having means capable of precisely controlling a temperature and preventing oxidation may be used as means for heat treating an electroconductive thin film on a substrate.

Any organic materials having insulating properties may be used for the recording layer 54. To form the recording layer 54, specifically, a vapor deposition method, a clustered ion beam method or the like may be used. However, an LB method is most preferable among the conventional well-known techniques from a point of view of controllability, simplicity, reproducibility, and smoothing a surface of a recording layer. According to this LB method, a monomolecular film of an organic compound having a hydrophobic portion and a hydrophilic portion within a molecule, or a film in which monomolecular films are stacked can be easily formed on a substrate. Furthermore, organic ultra-thin films having a thickness on a molecular order, are uniform and homegeneous over a large area, and are smooth which is required so that the substrate electrode can be stably provided.

For a recording layer, a member having a memory-switching phenomenon (electrical memory effect) regarding current-voltage characteristics, for example, an organic monomolecular film having molecules using both a group having a π electron level and a group having only a σ electron level stacked on an electrode, or a film in which organic monomolecular films are stacked are preferably used. Since, generally, most organic materials exhibit insulating or semi-insulating properties, a diverse range of organic materials having a π electron level are applicable to the present invention.

Preferred examples of coloring materials having a π electron system are: coloring materials having a porphyrin skeleton, such as phthalocyanine, tetraphenylporphyrin, azulene type coloring materials having a squarelium group or a croconic methyl group as a binding chain, and coloring materials similar to cyanine types in which two heterocycles containing nitrogen, such as quinoline, benzothiazole, or bensoxazole are bound by a squalirium group and a croconic methyl group, or a cyanine coloring material, condensed polycyclic aromatic such as anthracene or pyrene, and a chain compound in which aromatic rings and heterocyclic compounds are polymerized, and polymers of diacetylene, derivatives of tetracyanoquinonedimethane or tetrathiafulbaren and its analogous substances, its charge shift complexes, metallic complex compounds, such as ferrocene, trisbipyridine ruthenium complexes.

Preferred highpolymers are: addition polymers such as polyacrylic derivatives, condensed polymers such as polyimide, ring-opening polymers such as nylon, biopolymers such as bacteriorhodopsin.

It goes without saying that any organic materials and organic highpolymer materials suited for the LB method, in addition to those described above, are applicable to the present invention. For example, biomaterials (e.g., bacteriorhodopsin or cytochrome C), synthesized polypeptide (PBLG), which have come to be actively studied in recent years, or the like are applicable to the present invention.

The electrical memory effect of these compounds having a π electron level has been observed in those compounds having a film thickness less than tens of μm. Since a tunnel current flowing between the probe electrode and the substrate electrode during recording and reproduction is used, the probe electrode and the substrate electrode must be brought closer so that a tunnel current flows between them. Therefore, the film thickness including that of the recording medium should be between 0.2, 0.3 nm and 10 nm and, more preferably, between 0.2, 0.3 nm and 3 nm.

In the information processing apparatus according to the second embodiment of the present invention, any materials which are electroconductive may be used for the materials of a probe electrode which is positioned facing the recording medium and which generates a tunnel current. Examples of the materials are Pt, Pt-Ir, W, Au and Ag. The extreme end portion of the probe electrode must be sharpened as much as possible in order to increase the resolution of recording, reproduction and erasure.

In addition, there is no need to limit the number of probe electrodes to one. A plurality of probe electrodes may be used in order that they may be used separately for position detection and recording/reproduction. Recording and reproduction can be performed by applying a voltage from this probe electrode to a recording layer.

The present invention will be explained below in detail with reference to the embodiments.

First Embodiment

This embodiment concerns a first information processing apparatus of the present invention.

The information processing apparatus shown in FIG. 1 was manufactured. A Pt film was used for the lower electrode layer 4 of the recording medium, and a PZT film was used for the upper ferroelectric layer 3. The Pt film was formed by sputtering and had a strong orientation (111). The PZT film was also formed by sputtering and its residue polarization was 15 µC/cm$^2$ and its resisting electric field was 30 kv/cm.

The cantilever beam 2 serving as an elastic supporter was manufactured by micromechanics technology. FIG. 3 is a flow diagram illustrative of manufacturing a cantilever beam. First, an SiO$_2$ oxide film 32 was formed by thermal oxidation on an Si substrate 31. Then, a portion of the SiO$_2$ oxide film 32 was removed (FIG. 3(a)). Next, after the portion where the SiO$_2$ oxide film 32 was removed was anisotropically etched by a KOH etching solution, the SiO$_2$ oxide film 32 was removed by an HF solution (FIG. 3(b)). Next, an SiN film 33 was formed by an LPCVD method (FIG. 3(c)). This was bonded to a pyrex glass 34 by anode bonding. When there are portions not to be bonded, a Cr film 35 should be formed thereon beforehand (FIG. 3(d)). After the Si substrate 31 was removed by an etching solution, unnecessary pyrex glass was cut, thus manufacturing a cantilever beam (FIG. 3(e)). The spring constant of the cantilever beam 2 manufactured in this manner was 0.1 N/m.

The rear surface of the cantilever beam 2 is irradiated with laser beams from a semiconductor laser 14 and the position of the cantilever beam 2 is detected by a divided photodiode 13 receiving reflected beams. The resolution of position detection was 1 nm or less.

Recording and reproduction was performed by using this information processing apparatus. The polarization of recording bits was inverted in correspondence with signals of "1" and "0" at tens of nm intervals, and information was reproduced. A displacement of the cantilever beam 2 of 1 nm or above could be obtained, and thus information could be read out as satisfactory reproduced signals. When recording and reproduction was performed 10$^5$ times, a very stable nonvolatile memory system was shown that did not lose writing capability.

Second Embodiment

This embodiment concerns the first information processing apparatus of the present invention and is a modification of the first embodiment.

Figure 4:
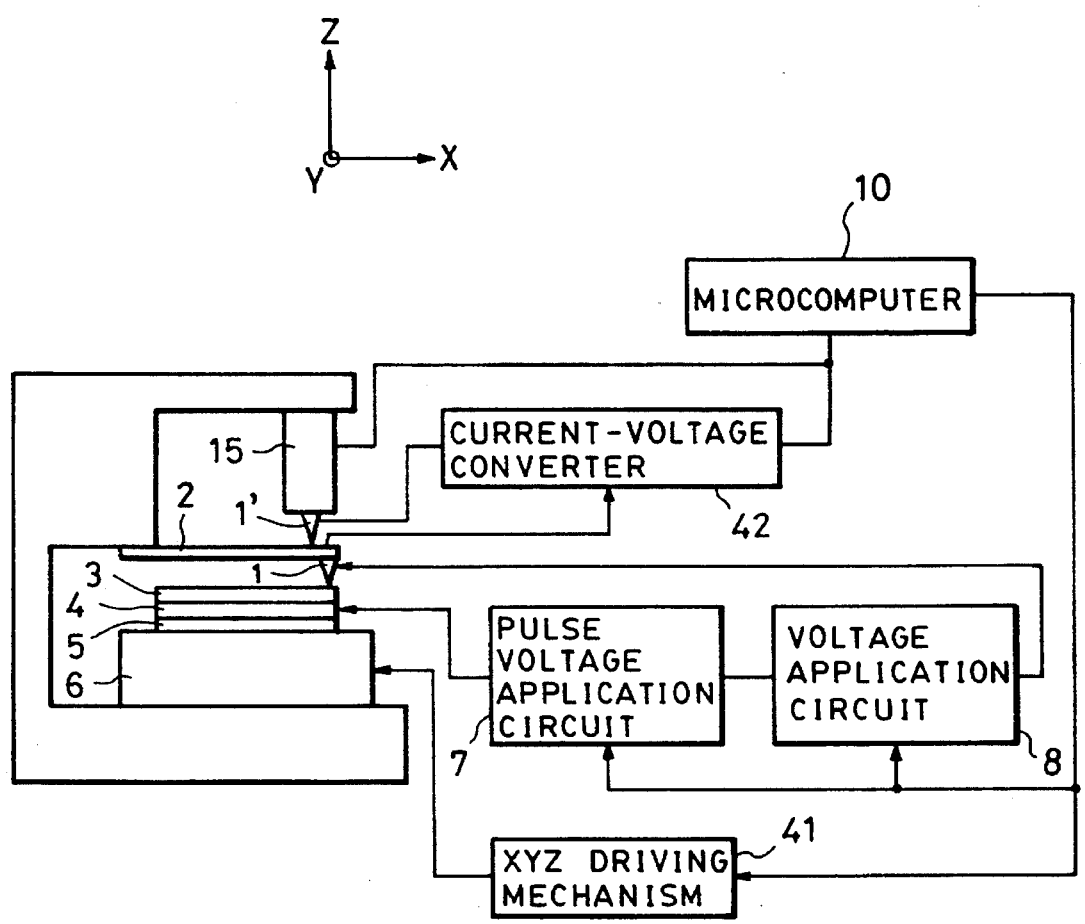
FIG. 4 illustrates another construction of the information processing apparatus of the present invention.
Figure 5A:
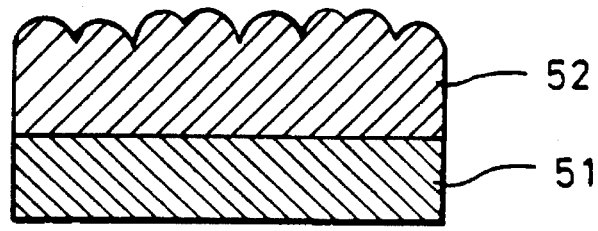
FIGS. 5(a), 5(b), 5(c) and 5(d) are flow diagrams illustrating preparation of a recording medium according to the present invention.
Figure 5B:
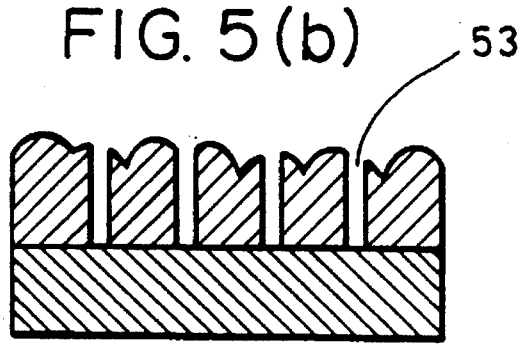
Figure 5C:
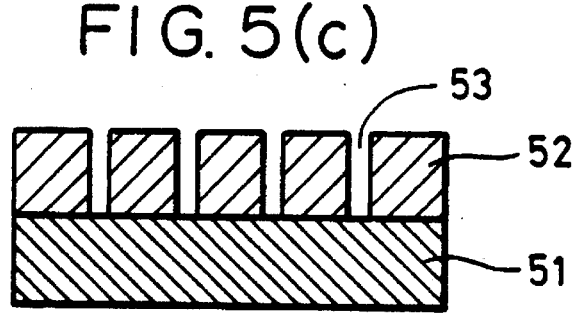
Figure 5D:
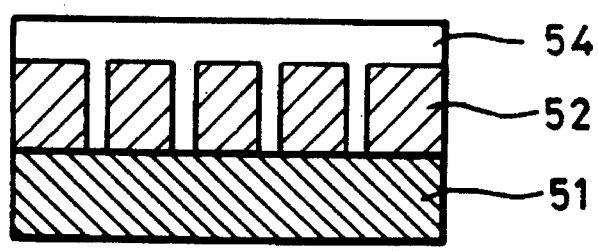

FIG. 4 illustrates the construction of the information processing apparatus according to this embodiment. An STM was used to detect the position of the cantilever beam 2. A probe electrode 1' is brought close to the rear surface of the cantilever beam 2, causing a tunnel current. Position detection is performed by using the tunnel current.

A Pt film was used for the lower electrode layer 4 of the recording medium, and a Bi$_4$Ti$_3$O$_{12}$ film was used for the upper ferroelectric layer 3. The Pt film was formed by a sputtering method, and the Bi$_4$Ti$_3$O$_{12}$ film was formed by a clustered ion beam deposition method. Its residue polarization was 1 µC/cm$^2$ and its resisting electric field was 30 kv/cm. The cantilever beam 2 was produced as in the first embodiment.

When recording and reproduction was performed in the same way as in the first embodiment, signals having a satisfactory S/N ratio could be read out. In addition, no deterioration of characteristics was observed in repeated recording and reproduction.

Third Embodiment

This embodiment concerns a second information processing apparatus of the present invention.

Figure 7:
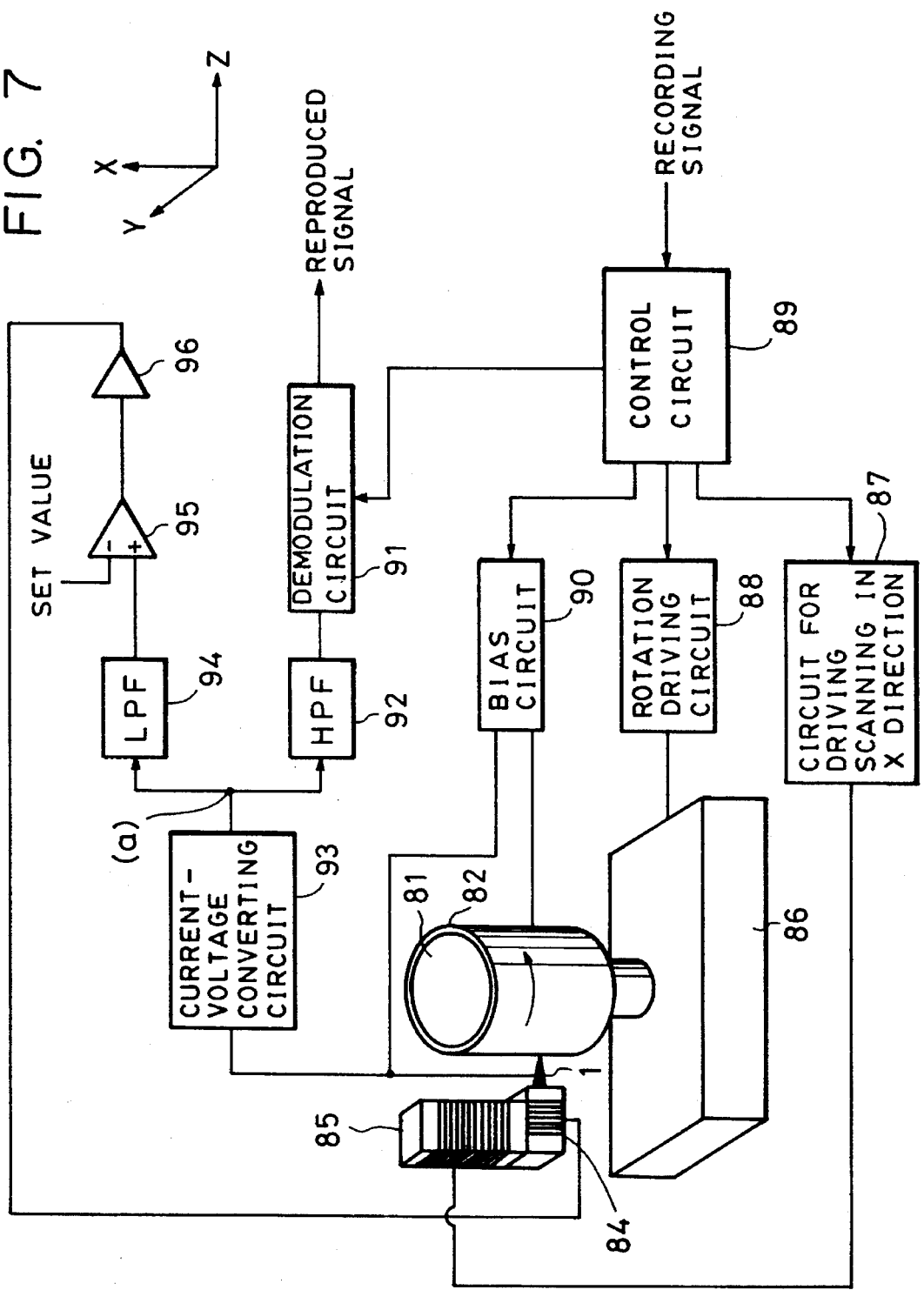
FIG. 7 illustrates still another construction of the information processing apparatus of the present invention.

The block diagram illustrating the construction of the information processing apparatus of this embodiment is shown in FIG. 7. A cylindrical base 81 and a mechanism 86 for rotating the cylindrical base 81 are mounted in the information processing apparatus. The cylindrical base 81 rotates at a fixed speed in the direction of the arrow in the figure. The probe 1 is made to scan by an operation mechanism 85 in an X direction parallel to the rotational shaft of the cylindrical base 81. A recording medium 82 was formed in such a way that an Au film was formed on the cylindrical base 81, and an LB film of eight layers of squalirium-bis-6-octylazulene (hereinafter abbreviated as SOAZ) was formed thereon. A platinum probe 1 is supported in a fine movement mechanism 84 using an piezoelectric element, and is finely movable in a Z direction perpendicular to the recording medium 82. A bias circuit 90 is connected to the recording medium 82 and the probe 1. A voltage for recording and erasure is generated through a control circuit 89 in accordance with a recording signal. A fixed voltage for reproducing information is generated to reproduce information.

A current-voltage converting circuit 93 is connected to the probe 1. This circuit 93 detects a tunnel current flowing from the probe 1 to the recording medium 82, amplifies the tunnel current and converts it into a voltage. Detected signals are extracted as reproduced signals through a high-pass filter 92 and a demodulation circuit 91. Low-frequency components of the detected signals are supplied to a differential amplifier 95. A distance control signal is output from the differential amplifier 95 so that the tunnel current of the probe 1 is maintained constant, and applied to the fine movement mechanism 84 in the Z direction through an amplifier 96. As a result, the distance between the probe 1 and the recording medium 82 is maintained constant.

Next, an explanation will be given of recording, reproduction and erasure when an SOAZ LB film formed on an Au film is used. When reproducing, a reading voltage not exceeding a threshold voltage which causes an electrical memory effect is applied between the probe 1 and the recording medium 82, and a probe is made to scan so that information is reproduced. When recording, a pulse voltage exceeding a threshold voltage which causes an ON state is applied; when erasing, on the contrary a pulse voltage exceeding a threshold voltage which causes an OFF state is applied.

Figure 8:
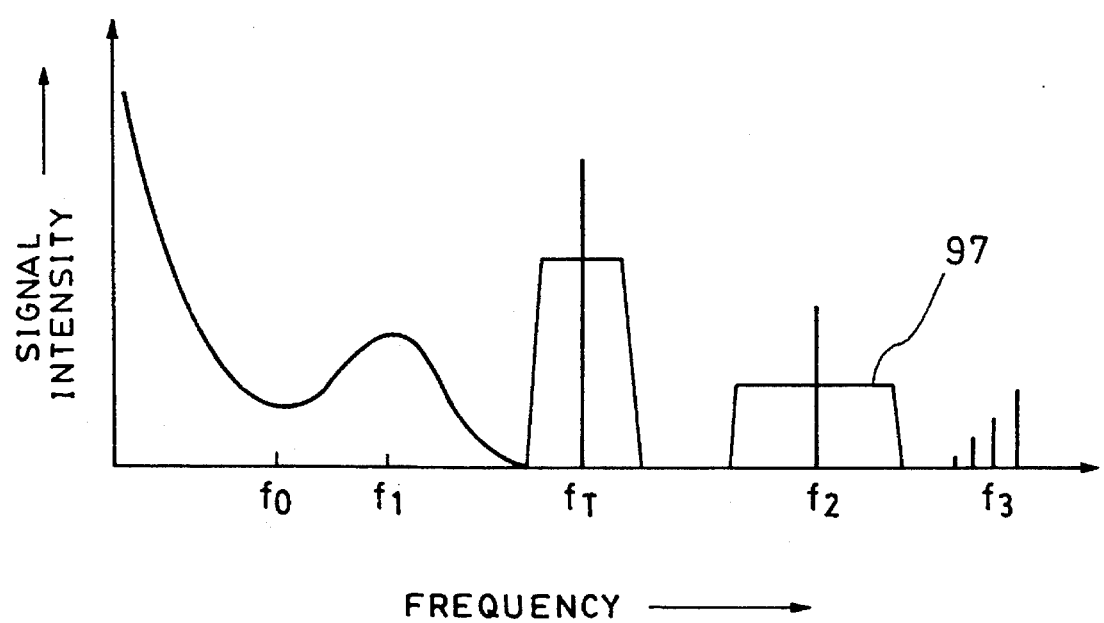
FIG. 8 illustrates a signal intensity spectrum of a reproduced signal when information is recorded and reproduced by an information processing apparatus of FIG. 7.

Data was recorded and reproduced by the above-described information processing apparatus. The signal intensity spectrum of reproduced signals extracted from those in FIG. 7 is shown in FIG. 8. In this figure, frequency components lower than $f_0$ are caused by a gentle slope of a recording medium due to warping, strain or the like of the cylindrical base 81. Signals with frequency $f_1$ as the center are caused by irregularities on the surface of the recording medium 82. $f_2$ indicates carrier waves of recording data. Reference numeral 97 denotes a signal band of the recording data. $f_3$ indicates a signal band which occurs due to the atomic and monomolecular array. $f_T$ indicates a tracking signal.

As can be seen in FIG. 8, since the information processing apparatus of the present invention is capable of separating recording data signal components and tracking signal components from components caused by a gentle slope of the base 81 and irregularities on the surface of the recording medium 82, reproduced signals having a satisfactory S/N ratio can be obtained at a high speed.

Fourth Embodiment

This embodiment concerns a second information processing apparatus of the present invention, and is a modification of the third embodiment.

Figure 9:
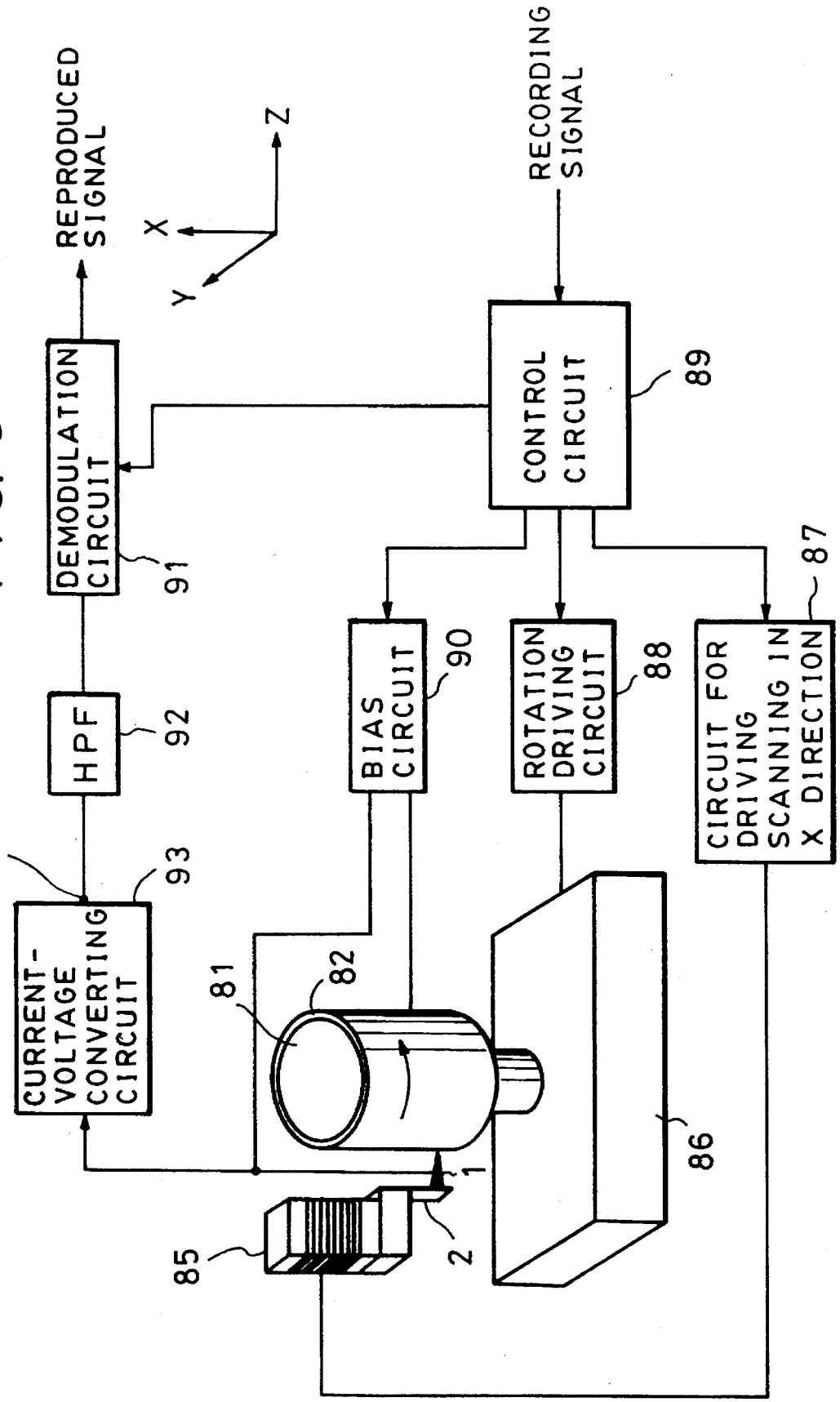
FIG. 9 illustrates still another construction of the information processing apparatus of the present invention.

The block diagram illustrating the construction of the information processing apparatus according to this embodiment is shown in FIG. 9. In this figure, reference numeral 2 denotes a cantilever beam which is an elastic support for supporting the probe 1, this probe 1 being provided on the free end of the cantilever beam 2. This cantilever beam 2 was formed to be an $Si_3N_4$ cantilever beam having a length of 200 μm, a width of 20 μm, and a thickness of 0.7 μm by an anisotropic etching technique which uses the characteristics of a silicon crystal to a high degree. This technique is well known [X. E. Petersen, Proc. IEEE 70, 420 (1982)]. Wiring for detecting a tunnel current of the probe 1 is also formed in the cantilever beam 2. Since control in the Z direction is performed by using the elasticity of the cantilever beam 2, the fine movement mechanism 84, and circuit systems 94, 95 and 96 for controlling the fine movement mechanism 84 in the third embodiment shown in FIG. 7 are not needed. The other components are the same as in the third embodiment.

Data was recorded and reproduced by the above-described information processing apparatus in the same way as in the third embodiment. In the signal intensity spectrum of the reproduced signals extracted from FIG. 9, since low-frequency components caused by, as in FIG. 8, irregularities and a gentle slope of the recording medium due to warping, strain or the like of a base can be separated from carrier waves $f_2$ of recording data, the signal band 97 of the recording data and the tracking signal $f_T$. Reproduced signals having a satisfactory S/N ratio are obtained.

Fifth Embodiment

This embodiment concerns a second information processing apparatus of the present invention and is a modification of the fourth embodiment.

Figure 10:
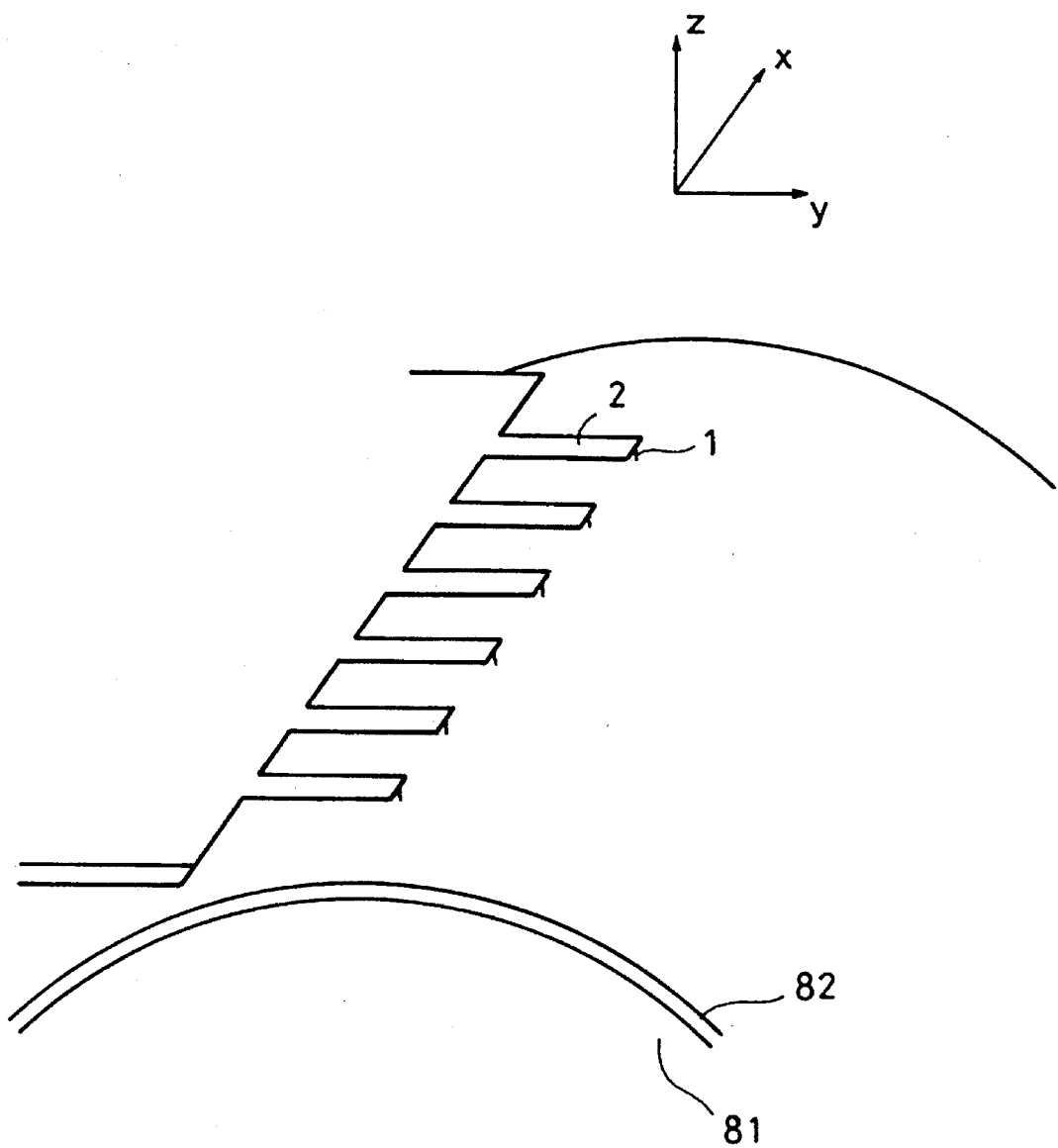
FIG. 10 illustrates still another construction of the information processing apparatus of the present invention.
Figure 11:
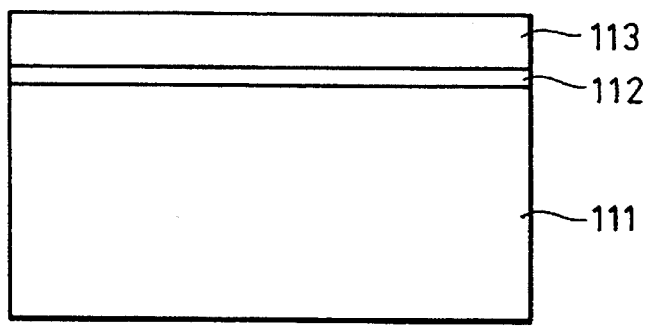
FIG. 11 illustrates the structure of a recording medium used in a conventional information processing apparatus.
Figure 12:
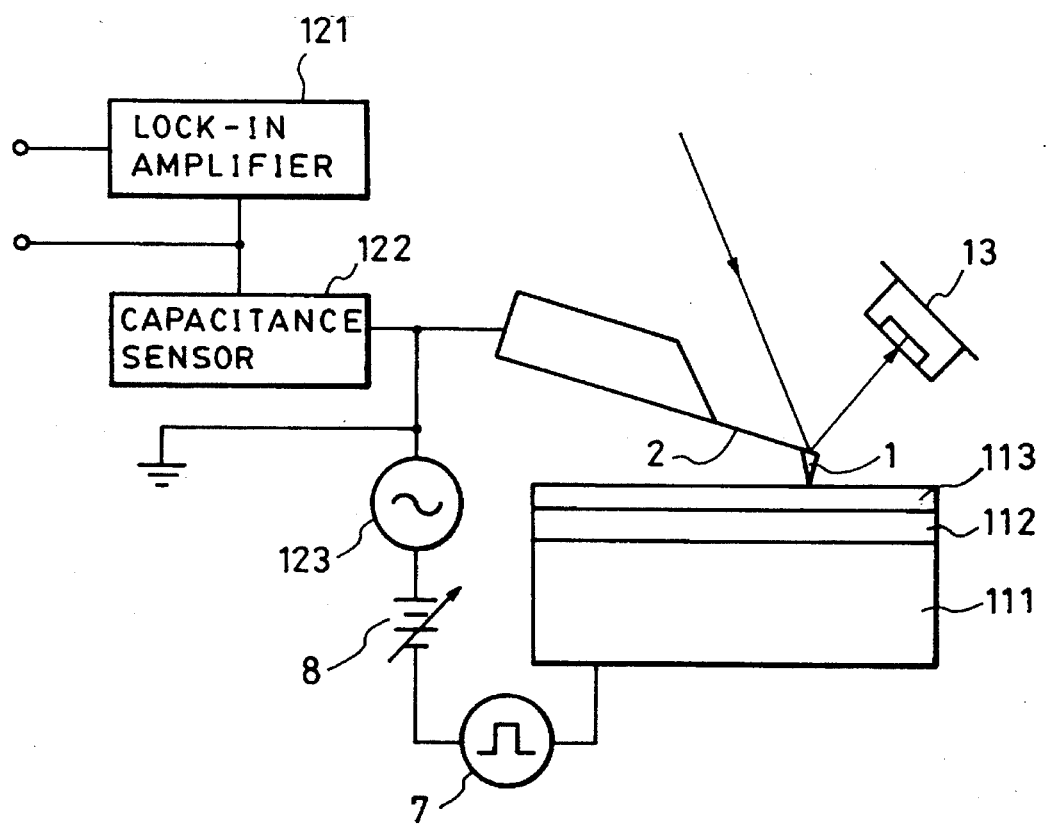
FIG. 12 illustrates the construction of a conventional information processing apparatus.

The construction of the information processing apparatus of this embodiment is similar to that of the fourth embodiment except for the probe electrode portion. A perspective view of the probe electrode portion is shown in FIG. 10. Reference numeral 2 denotes a cantilever beam which is an elastic supporter for supporting the probe 1, this probe 1 being provided on the free end of the cantilever beam 2. The cantilever beam 2 was formed by a silicon anisotropic etching technique in the same way as in the fourth embodiment. In this embodiment, a plurality of cantilever beams 2 are formed, and arranged parallel to the rotational shaft of the cylindrical base 81.

Wiring for detecting a tunnel current of the probe 1 is also formed on the cantilever beam 2. Since the plurality of cantilever beams 2 perform control in the Z direction by using the elasticity thereof, the Z-axis fine-movement mechanism 84, and circuit systems 94, 95 and 96 for controlling the fine movement mechanism 84 in the third embodiment are not needed. Even though a plurality of cantilever beams 2 are formed, they are used in combination with the cylindrical base 81. Therefore, the positioning of the cantilever beam 2 with the recording medium 82 need to be performed only in the x direction, which is easy.

Data was recorded and reproduced by the above-described information processing apparatus in the same way as in the fourth embodiment. In the signal intensity spectrum of the reproduced signals extracted from those FIG. 9, since low-frequency components caused by, as in FIG. 8, irregularities and a gentle slope of the recording medium due to warping, strain or the like of a base can be separated from carrier waves $f_2$ of recording data, the signal band 97 of the recording data and the tracking signal $f_T$. Reproduced signals having a satisfactory S/N ratio are obtained.

Sixth Embodiment

This embodiment concerns a method of manufacturing recording media according to the present invention shown in FIG. 5. The manufacturing method will be explained below.

First, an optically polished glass substrate was cleaned using a neutral detergent and trichlene and formed into a substrate 51. Then, an Au film was formed on the substrate 51 by a vacuum deposition method, thus forming a substrate electrode 52. The deposited Au film was etched by a focused ion beam (FIB) method so that holes reaching the substrate were formed. At this time, 100 holes, approximately 0.3 μm in size, were formed at 10 μm pitches (10 holes vertically and 10 holes horizontally) on lattice points perpendicular to the writing of FIB (areas of a 100 μm square are called hole formed areas). Writing was performed under the condition of a dose of $1.0 \times 10^{12}$ ions/cm. Next, the substrate was heat treated in an Ar atmosphere under the conditions of a temperature increasing speed of 200° C./sec, a treatment temperature of 800° C., and a treatment time of 10 sec. When the electrode surface of the treated substrate was observed by an optical microscope, no film peeling-off occurred in areas where holes were formed. Ten grooves of a longitudinal line of 10 μm was produced by FIB writing at 10 μm pitches. The breadth of the grooves was approximately 0.3 μm (these areas of a 100 μm square are called groove formed areas). Writing was performed under the condition of a dose of $1.0 \times 10^{12}$ ions/cm. Next, heat treatment was performed in the same manner as for the hole formed areas. When the electrode surface of the treated substrate was observed by an optical microscope, no peeling-off of film occurred in areas where grooves were formed. Finally, a polyimide (hereinafter abbreviated as PI) LB film which serves as the recording layer 54 was formed on the electrode.

A method of forming an LB film will be explained below.

Polyamic acid (hereinafter abbreviated as PA) shown in formula (1) was dissolved in an N, N-dimethyl acetamide-benzene mixed solution (1:1 V/V) (monomer conversion density: $1 \times 10^{-3}$ M). Thereafter, $1 \times 10^{-3}$ M of N,N-dimethyl octadecylamine by the same solvent, which was prepared separately, was mixed at 1:2 (V/V). Thus, a polyamide acid octadecylamine solution shown in formula (2) was prepared. After the solution was developed in pure water at 20° C. and the solvent was evaporated from the water surface, the surface pressure thereof was increased to 25 mN/m and a monomer film was formed on the water surface. Next, the substrate was gently immersed at a speed of 5 mm/minute in the water surface so as to traverse and further pulled up while the surface pressure was maintained constant. Thus, four layers of Y-type monomer films were stacked. Finally, the PA stacked film was formed into imido (formula (3)) by heat treating the substrate at 300° C. for 10 minutes, thus forming a PI thin film which serves as the recording layer 54. Thus, a recording layer was obtained.

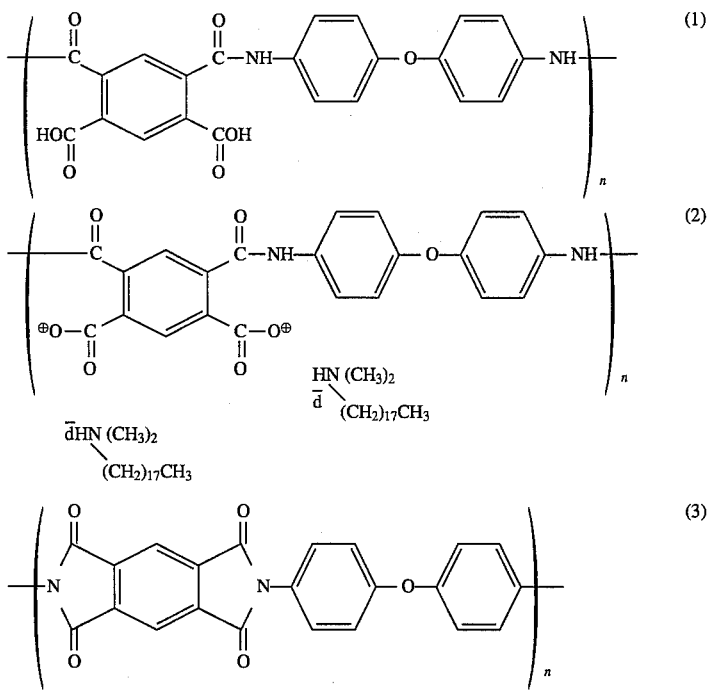

Figure 13:
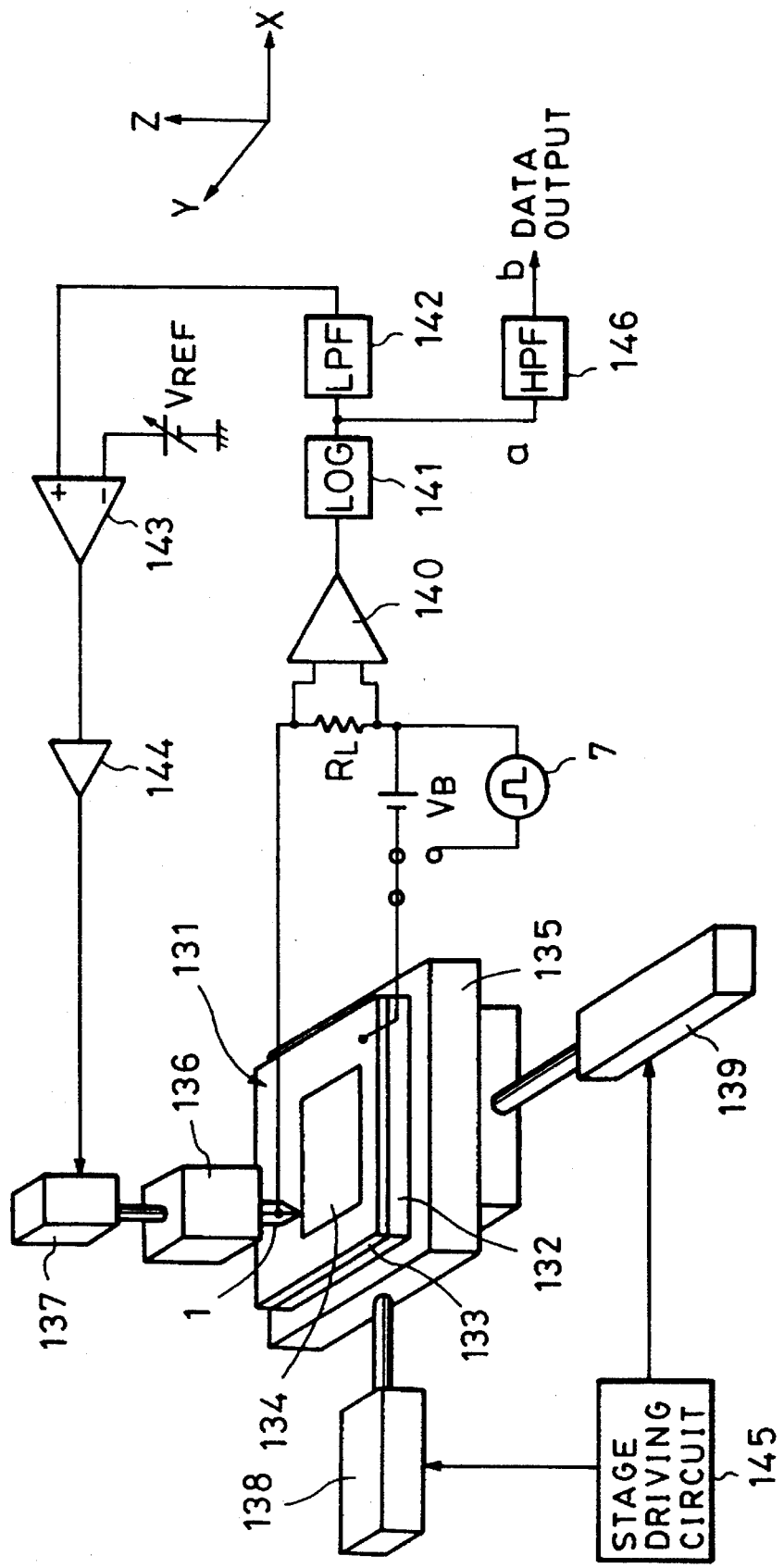
FIG. 13 illustrates the construction of a conventional information processing apparatus in which an STM is used.
Figure 14:
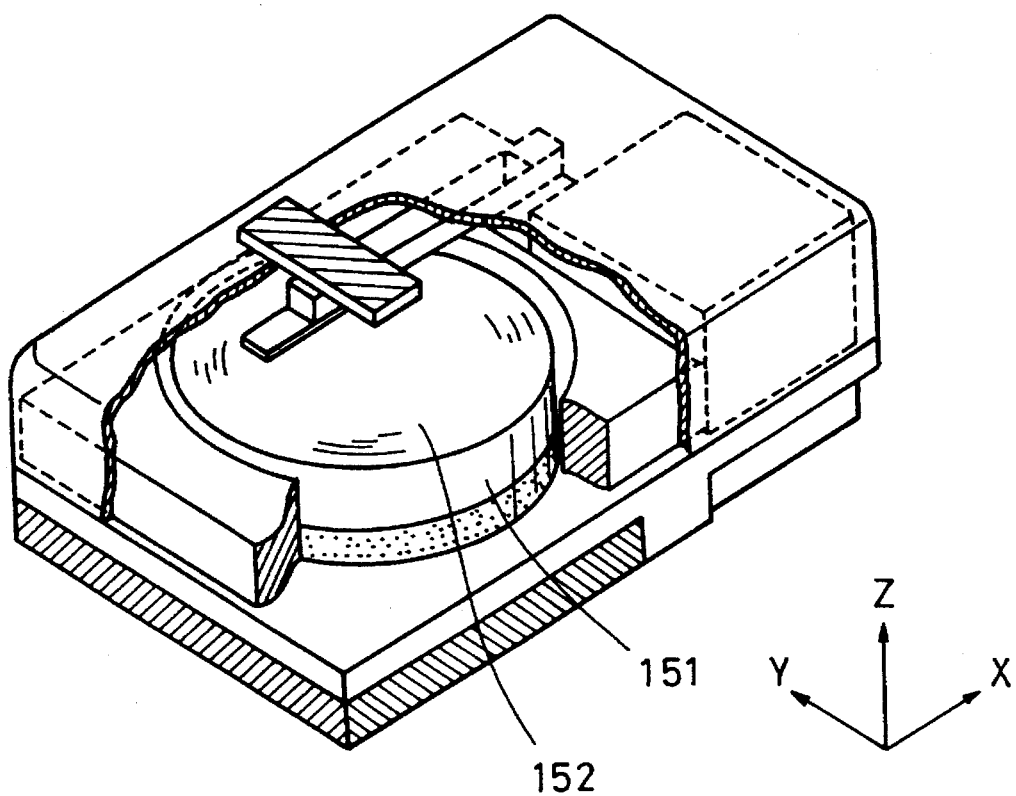
FIG. 14 illustrates another construction of the conventional information processing apparatus in which a STM is used.
Figure 15:
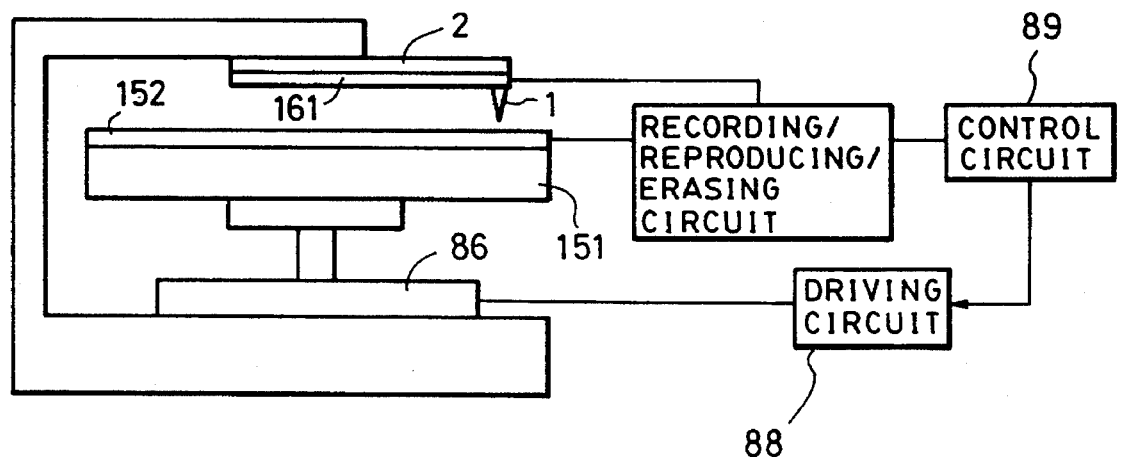
FIG. 15 illustrates the construction of a conventional information processing apparatus in which an STM and an AFM are used.
Figure 16:
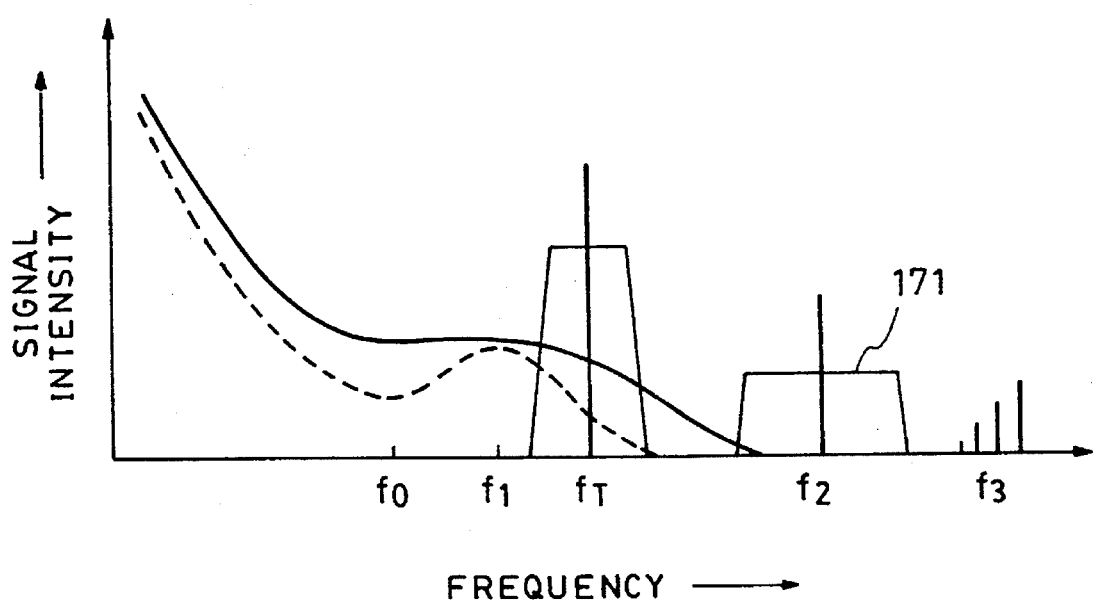
FIG. 16 illustrates a signal intensity spectrum of a reproduced signal when information is recorded and reproduced by an information processing apparatus of FIG. 14.
Figure 17A:
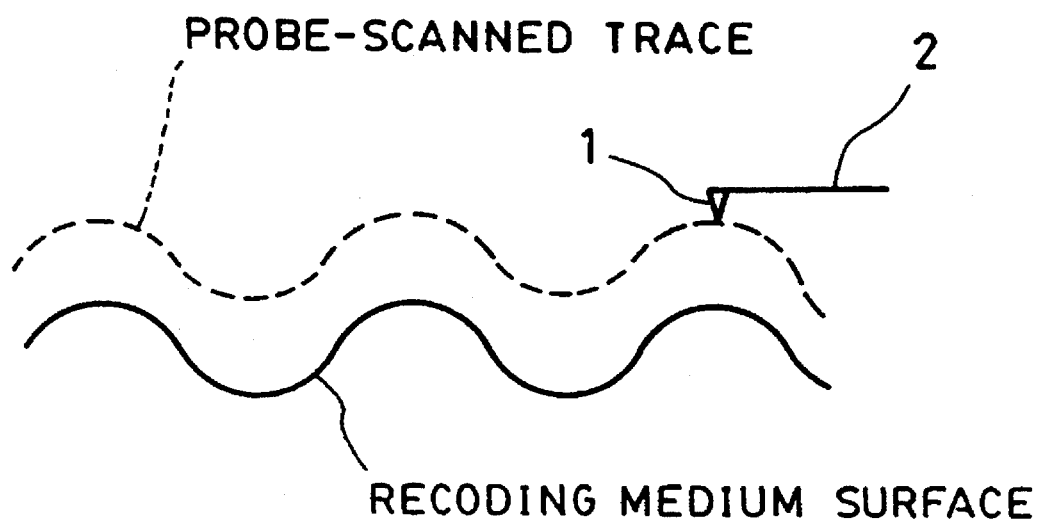
FIGS. 17(a) and 17(b) are schematic illustrations of a trace of a probe when a surface of a recording medium is scanned by the probe.
Figure 17B:
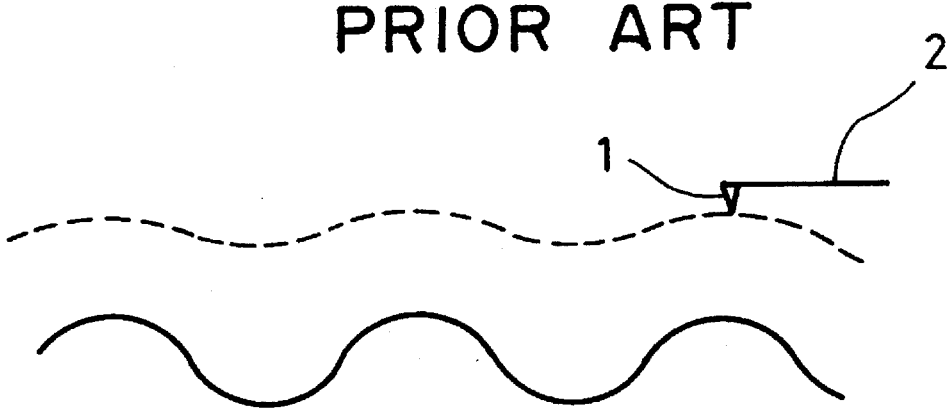

The recording medium prepared in the above-described way was placed on the XY stage 135 of the otherwise conventional information processing apparatus shown in FIG. 13. When the surface of the hole formed areas and groove formed areas was examined by using the platinum/ rhodium probe electrode 1, the surface of the recording medium reflected the smoothness of the substrate electrode; the surface irregularities were 1 nm or less in a 10 μm square.

Next, experiments of recording, reproduction and erasure were performed. A voltage of +1.5 V was applied between the probe electrode 1 and the electrode layer 133 of the recording medium. The distance Z between the probe electrode 1 and the surface of the recording layer 134 was adjusted. At this time, a probe current for controlling the distance Z was set at $10^{-10} A \geq I_p \geq 10^{-11}$ A.

Figure 6:
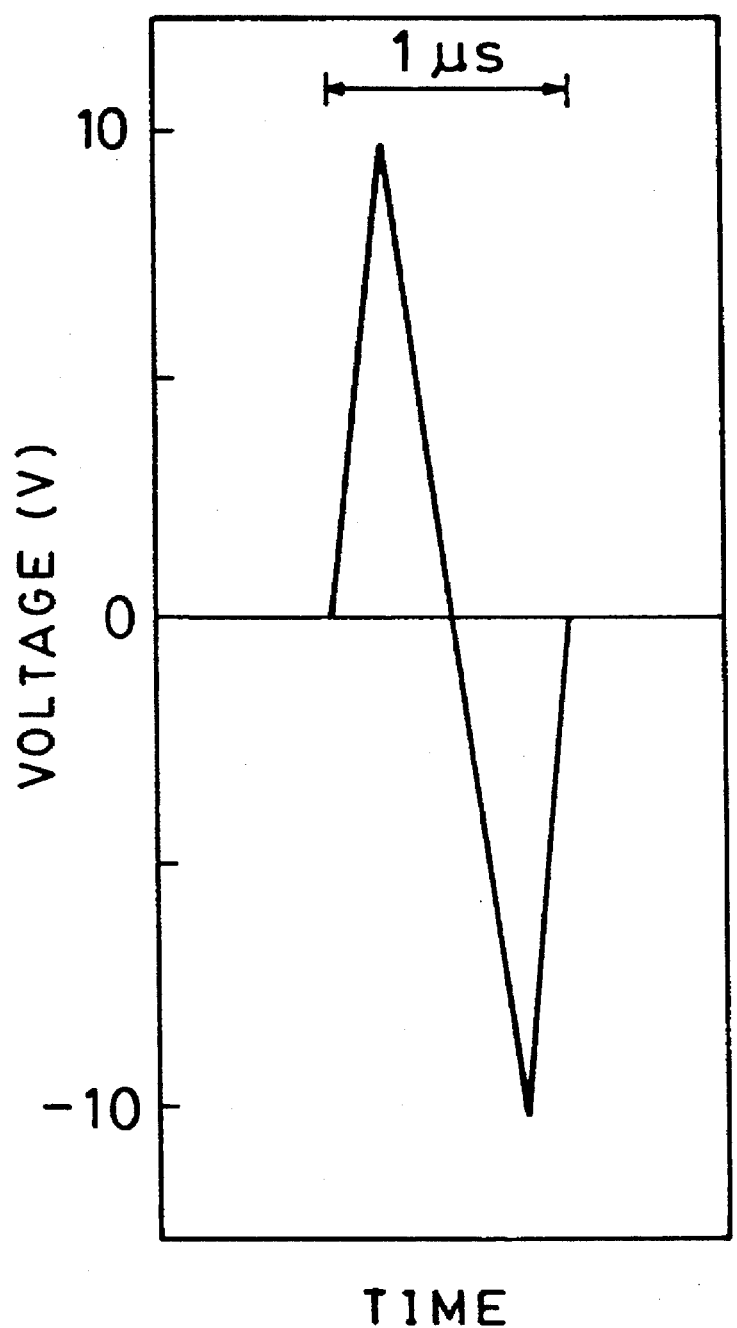
FIG. 6 is illustrative of the the waveform of a pulse voltage applied during recording onto a recording medium according to the present invention.

Next, information was recorded in hole formed areas and groove formed areas at 10 nm pitches while the probe electrode 1 was being scanned. To record information, with the probe electrode 1 at the + side and the electrode layer 133 at the − side, a pulse voltage of a threshold voltage $V_{th}ON$ shown in FIG. 6 by which an electrical memory material (four layers of polyimide LB films) changes to a low resistance state (ON state) was applied. Then, the probe electrode 1 was returned to the recording starting point, and the probe electrode 1 was made to scan the recording layer 134. At this time, adjustments were made so that the distance Z was constant when information were read out As a result, a probe current of approximately 10 nA flows, and it was shown that the recording bits were on.

When the probe voltage was set at 10 V which is greater than the threshold voltage $V_{th}OFF$ by which an electrical memory material changes from the ON state to the OFF state and the recording position was traced, it was confirmed that all records were erased and shifted to the off state.

Seventh Embodiment

This embodiment is a modification of the sixth embodiment.

In this embodiment, a recording layer was prepared in the same way as in the third embodiment except that the recording medium was selectively etched using a resist as a method of forming holes or grooves reaching a substrate. At this time, an Au thin film was selectively etched by using AZ1350 (Sipray Far East) as a resist, thus forming a pattern similar to that in the third embodiment. No peeling-off of film occurred in hole formed areas and groove formed areas in this step.

When irregularities on the surface of the recording medium were examined in the same manner as in the sixth embodiment, the irregularities were 1 nm or less in a 10 μm square. When experiments of recording, reproduction and erasure were made, the same results as in the sixth embodiment were obtained.

Eighth Embodiment

This embodiment is a modification of the sixth and seventh embodiments.

In this embodiment, a recording medium was prepared in the same way as in the sixth embodiment except that selective wet etching using a resist was performed. At this time, the recording medium was patterned as in the seventh embodiment by using a resist similar to that of the seventh embodiment. No peeling-off of film occurred in hole formed areas and groove formed areas in this step.

When irregularities on the surface of the recording medium were examined in the same manner as in the sixth embodiment, they were as smooth as in the sixth embodiment. When experiments of recording, reproduction and erasure were made, the same results as in the sixth embodiment were obtained.

Ninth Embodiment

This embodiment is a modification of the seventh embodiment.

In this embodiment, a substrate electrode was formed by an ordinary vacuum deposition method using Ag. A recording medium was prepared in the same way as in the seventh embodiment except that the substrate electrode was heat treated at a temperature of 700° C. No peeling-off of film occurred in hole formed areas and groove formed areas in this step.

When irregularities on the surface of the recording medium was examined in the same manner as in the sixth embodiment, the irregularities were 1 nm or less in a 10 μm square. When experiments of recording, reproduction and erasure were made, the same results as in the sixth embodiment were obtained.

Tenth Embodiment

This embodiment is a modification of the sixth embodiment.

In this embodiment, a substrate electrode was formed by an ordinary vacuum deposition method using Ag. A recording medium was prepared in the same way as in the seventh embodiment except that a substrate electrode was heat treated using an electrical furnace at a reduced pressure of 40 mm Torr, at a temperature increasing speed of 20° C./sec, at a treatment temperature of 800° C. for a treatment time of one minute. No peeling-off of film occurred in hole formed areas and groove formed areas in this step.

When the irregularities on the surface of the recording medium were examined in the same manner as in the sixth embodiment, they were 1 nm or less in a 10 μm square. When experiments of recording, reproduction and erasure were made, the same results as in the sixth embodiment were obtained.

Eleventh Embodiment

This embodiment is a modification of the seventh embodiment.

In this embodiment, a recording medium was prepared in the same way as in the seventh embodiment except that Au-Pd was used as a material of the substrate electrode. No peeling-off of film occurred in hole formed areas and groove formed areas in this step.

When irregularities on the surface of the recording medium were examined in the same manner as in the sixth embodiment, the irregularities were 1 nm or less in a 10 μm square. When experiments of recording, reproduction and erasure were made, the same results as in the sixth embodiment were obtained.

Twelfth Embodiment

This embodiment is a modification of the sixth embodiment.

In this embodiment, a recording medium was prepared in the same way as in the seventh embodiment except that the substrate electrode was heat treated at 900° C. No peeling-off of film occurred in hole formed areas and groove formed areas in this step.

When irregularities on the surface of the recording medium were examined in the same manner as in the sixth embodiment, they were 1 nm or less in a 10 μm square. When experiments of recording, reproduction and erasure were made, the same results as in the sixth embodiment were obtained.

Thirteenth Embodiment

In this embodiment, in regard to the substrate electrode prepared in the same way as in the sixth embodiment, experiments of recording, reproduction and erasure using local changes in the surface of the substrate electrode due to a local electric-field application between the probe and the substrate electrode by using an Au probe were made in a condition in which no recording layer was formed. The probe was grounded, and the crest value/pulse width of the voltage was 3.6 V/600 nsec. When recorded portions were observed as in the sixth embodiment after this operation was performed at 50 nm pitches, recorded bits having a diameter of 20 nm and a height of 3 nm could be seen.

As has been explained above, the present invention has the following advantages.

(1) No problems, for example, unstable recording characteristics of a recording medium or deterioration of non-volatility thereof, occur in an information processing apparatus which records and reproduces information by using a ferroelectric substance in a recording layer which forms a recording medium and by changing the polarity of the spontaneous polarization of this ferroelectric substance.

In addition, since recorded information is reproduced by position detection using a force acting between a probe electrode and a recording medium, components, such as capacitance sensors or lock-in amplifiers required in the past, are not needed. Also, there is no need to selectively heat a recording medium and read signals caused by the pyroelectric activation of the recording medium with an electrometer. Thus, the apparatus can be simplified and miniaturized.

(2) Since a plurality of holes or grooves are formed on a portion of an electroconductive thin film, and such holes or grooves reach a substrate, when a lower electrode layer of the recording medium is formed and then heat treated, the surface of a substrate electrode can be smoothed without causing damage, such as peeling-off of film of the substrate electrode. Thus, an information processing apparatus using recording media manufactured in this manner and having a satisfactory S/N ratio and high reliability can be obtained.

(3) Since the speed of a probe relative to that of a recording medium is fixed in an information processing apparatus which records and reproduces information by rotating a cylindrical recording medium, resonance and a decrease in an S/N ratio of reproduced signals during high-speed scanning can be prevented. Thus, information processing at a large capacity and high-speed response with a high degree of accuracy is made possible.

Many different embodiments of the present invention may be constructed without departing from the spirit and scope of the present invention. It should be understood that the present invention is not limited to the specific embodiment described in this specification. To the contrary, the present invention is intended to cover various modifications and equivalent arrangements included within the spirit and scope of the claims. The following claims are to be accorded the broadest interpretation, so as to encompass all such modifications and equivalent structures and functions.

What is claimed is:

1. An information processing apparatus which reproduces information by detecting a force acting between an information reading probe and a surface of a recording medium, comprising:

means for applying a voltage between the probe and the recording medium; and displacement detecting means for detecting the force acting between the recording medium and the probe, wherein said recording medium includes a substrate electrode and a ferroelectric material layer provided thereon and said force is an electrostatic force.

2. An information processing apparatus according to claim 1, wherein the probe is provided on an elastic supporting member.

3. An information processing apparatus according to claim 2, wherein the displacement detecting means comprises light irradiating means for irradiating light to the elastic supporting member and light detecting means for detecting light reflected by the elastic supporting member.

4. An information processing apparatus according to claim 3, wherein the light irradiating means is a laser and the light detecting means is a photodiode.

5. An information processing apparatus which records and reproduces information using an information reading probe and a recording medium, comprising:

means for detecting an electric current flowing between the probe and the recording medium or an atomic force acting between the probe and the recording medium; and driving means for driving said recording medium, wherein said recording medium comprises a cylindrical shape recording medium with an elongated base, said probe facing a cylindrical surface of the recording medium, and the driving means includes means for rotating said recording medium.

6. An information processing apparatus according to claim 5, further comprising: means for adjusting the distance between the probe and the surface of the recording medium.

7. An information processing apparatus according to claim 5, wherein a plurality of probes are provided parallel to each other on a substrate.

8. An information processing apparatus according to claim 5, wherein said recording medium comprises an organic thin film formed on a substrate electrode.

9. An information processing apparatus according to claim 5, further comprising: means for causing the probe to scan substantially parallel to a rotational shaft of the cylindrical base.

10. An information processing apparatus according to claim 5, further comprising: means for bringing the probe close to the surface of the recording medium in linkage with the rotation of the cylindrical base.

11. An information processing method which reproduces information by detecting a force acting between an information reading probe and a surface of a recording medium, said recording medium having a ferroelectric material layer provided on a substrate electrode and said force being an electrostatis force, said method comprising the steps of:

bringing the probe closer to the recording medium in which information is recorded in the form of changes in spontaneous polarization; and detecting the force acting between the probe and the recording medium.

12. An information processing method according to claim 11, wherein the probe is provided on an elastic supporting member.

13. An information processing method according to claim 12, wherein a displacement of the elastic supporting member due to the force is detected by irradiating light of the elastic supporting member and detecting light reflected by the elastic supporting member.

* * * * *

UNITED STATES PATENT AND TRADEMARK OFFICE
CERTIFICATE OF CORRECTION

PATENT NO. : 5,481,527

DATED : January 2, 1996

INVENTORS : YUJI KASANUKI ET AL.

It is certified that error appears in the above-identified patent and that said Letters Patent is hereby corrected as shown below:

ON TITLE PAGE:

[56] Foreign Patent Documents:

"1134753   5/1989 Japan" should read --1-134753   5/1989 Japan--.

COLUMN 1

Line 16, "Of" should read --of--;
Line 66, "a" should read --an--.

COLUMN 2

Line 14, "$10^{10 bits/cm^2}$" should read --$10^{10}$ bits $cm^2$--.

COLUMN 3

Line 59, "a" should read --an--.

COLUMN 6

Line 35, "the (second occurrence) should be deleted.
Line 56, "a" should read --an--.

UNITED STATES PATENT AND TRADEMARK OFFICE
CERTIFICATE OF CORRECTION

PATENT NO. : 5,481,527

DATED : January 2, 1996

INVENTORS : YUJI KASANUKI ET AL.

It is certified that error appears in the above-identified patent and that said Letters Patent is hereby corrected as shown below:

COLUMN 10

Line 18, "squarelium" should read --squarilium--
Line 22, "bensoxazole" should read --benzonazole--.

COLUMN 15

Line 64, "out As" should read --out. As--.

COLUMN 17

Line 20, "was" should read --were--.

COLUMN 18

Line 48, "heat treated" should read --heat-treated--.

UNITED STATES PATENT AND TRADEMARK OFFICE
CERTIFICATE OF CORRECTION

PATENT NO. : 5,481,527

DATED : January 2, 1996

INVENTORS : YUJI KASANUKI ET AL.

Page 3 of 3

It is certified that error appears in the above-identified patent and that said Letters Patent is hereby corrected as shown below:

COLUMN 20

Line 24, "electrostatis" should read --electrostatic--.

Signed and Sealed this

Fourth Day of June, 1996

Attest:

BRUCE LEHMAN

Attesting Officer   Commissioner of Patents and Trademarks